April 19, 1932.  F. F. ANDERSEN  1,854,537

PNEUMATIC TIRE FOR VEHICLES

Filed March 1, 1930

Inventor:
Felix Fridtjov Andersen
By
Pennie Davis Marvin & Edmonds
attorneys

Patented Apr. 19, 1932

1,854,537

UNITED STATES PATENT OFFICE

FELIX FRIDTJOV ANDERSEN, OF OSLO, NORWAY

PNEUMATIC TIRE FOR VEHICLES

Application filed March 1, 1930. Serial No. 432,498.

The present invention relates to pneumatic tires for vehicles of any type and more especially to that type of pneumatic tire having an annular chamber, serving as air container to create a cushion.

According to the present invention improvements are made in a tire of the above mentioned type, whereby the pressure in the pressure chamber may be reduced to a substantial degree.

The object of the present invention thus is to provide a pneumatic tire, which is adapted to carry a substantial weight without the need of high pressure in the pressure chamber, and by means of this invention one of the greatest disadvantages in this type of tire is thereby eliminated.

This object is reached by combining the action of a cushion of this kind as a compression chamber with the action as a vacuum chamber, both actions being performed simultaneously, the ring piston creating by its deformation a compression on its inside and a vacuum on its outside.

According to this invention the annular chamber forms an air container, having all round nonelastic walls, and within this container the ringformed piston is placed. The latter is acted upon by a member, entering through the outside periphery of the said chamber, and having sliding airtight steering therein, which member acts to transmit the road pressure from the tire proper or tread to the said piston inside the pressure chamber. In this way the space on the side of the said piston ring towards the centre of the wheel will act as a pressure chamber, while the space on the outside of the piston ring will act as a vacuum chamber, when the piston ring is forced towards the centre of the wheel by means of the road pressure against the tire proper.

When choosing proper dimensions in the construction of the tire in relation to the weight which the tire is supposed to carry, it has been proved that the air pressure in the pressure chamber for usual loads does not necessarily need to be very much more than atmospheric pressure.

In order to make this invention understood, it will in the following be described with reference to the drawings, illustrating a preferred embodiment of the same.

Figure 1:
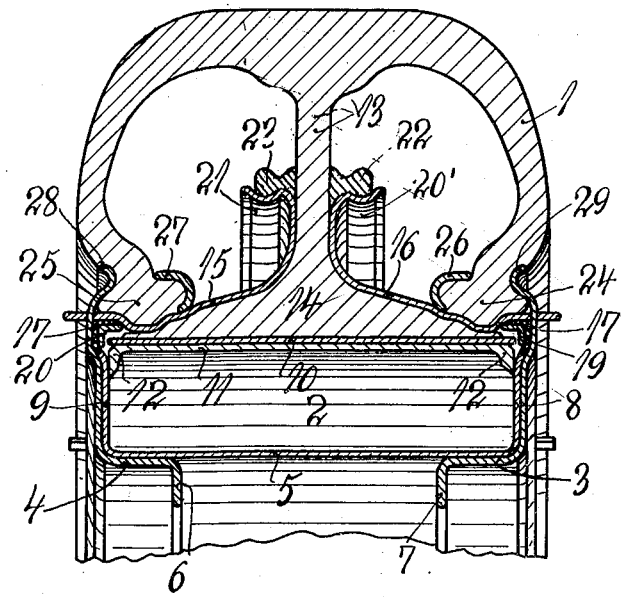
Figure 2:
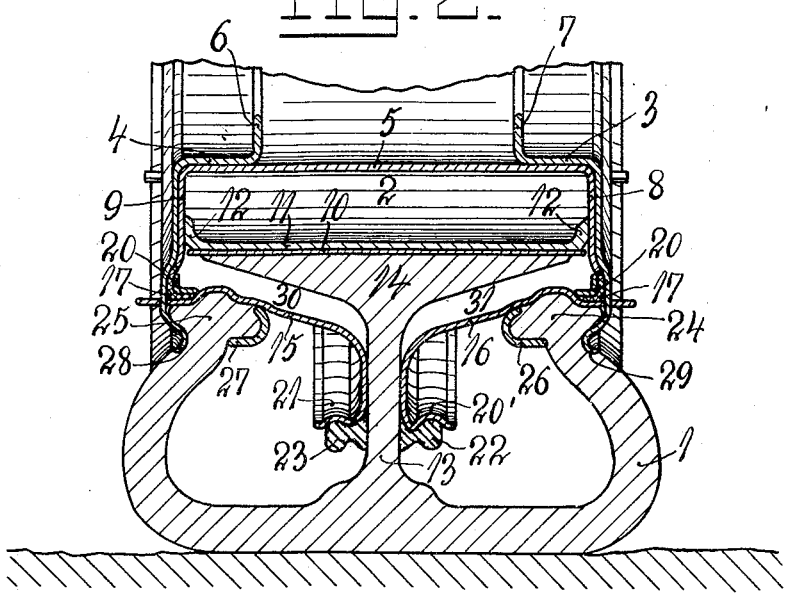

In the drawings is shown a fractional cross section through an automobile wheel according to the invention, where Fig. 1 illustrates the upper part of the wheel, while Fig. 2 illustrates that part of the wheel which is in contact with the road surface.

In the drawings, the tire consists of the outside tread or tire proper 1 and a pressure chamber 2, having metallic ring-shaped sides 3 and 4 with in-bent flanges 6 and 7, by means of which the pressure chamber or the complete assembly may be attached to any ordinary automobile wheel, not illustrated in the drawings.

Within the ringshaped side members 3 and 4 an annular container 5 with U-shaped cross section is fastened. Towards the periphery this chamber is airtightly closed by means of members which will be described below. The said annular container 5 forms the pressure chamber 2 and has plane parallel side walls 8 and 9. In the pressure chamber 2 a ringformed member 10, made of a steel plate, and of a resilient or springy nature, is arranged, this plate forming the piston in the pressure chamber. The plate or piston 10 can be provided with rubber lining 11 on the inside, the side edges of which have radially extending packings 12 in airtight contact with the side-edges 8 and 9 of the pressure chamber 2. The tire proper 1 has a central radially extending flange 13, which towards the centre of the wheel has a foot-like enlargement 14 in contact with the outside periphery of the ring 10. This member serves to transmit the pressure from the road surface to the said ring or piston 10.

When the wheel is subjected to a load, the foot 14 with the piston 10 will be moved towards the centre of the wheel against the action of the air pressure in the chamber 2.

According to the invention, the chamber 2 is airtightly closed towards the periphery outside the ring 10 by means of metal elements 15 and 16, which are airtightly connected to the side-edges 8 and 9 of the pressure chamber 2, by means of suitable rubber packings or the like 17 and ring-members 19 and 20, serving to hold the rubber packings 17, in airtight connection with the sides of the pressure chamber 2 on the one side and with the members 15 and 16 on the other side.

The members 15 and 16 are given substantial ring-shape and have a form which corresponds to the outside form of the foot 14 and the flange 13 in such a way that the inner edges of the said rings will have airtight slidable contact with the flange 13, which—if it is found necessary—may be provided with out-bent flanges 20' and 21, serving to support ring-formed rubber packings 22 and 23, which further will ensure the airtight connection between the said members 15 and 16 and the flange 13, which is fastened to the tire proper 1. The side edges 24 and 25 of the tire proper 1 can be fastened to the side edges of the metal construction in any suitable way, for instance as illustrated in the drawings by means of ring members 26 and 27 and out-bent extensions 28 and 29 of the side rings 3 and 4 previously mentioned.

When the wheel as illustrated in Fig. 2 is subjected to a pressure from the road, the tire proper 1 will be pressed together and the flange 13 will force the piston 10 in towards the centre of the wheel, whereby the air pressure in the chamber 2 will be increased. At the same time the airtight sliding contact between the members 15 and 16 and the packings 22 and 23 will prevent the outside air from entering in between the foot 14 and the rings 15 and 16, and in this way there will be established a vacuum in the chambers 30 and 31 between the foot 14 and the rings 15 and 16 respectively, which will take part in the work which has to be done in order to carry the weight of the vehicle.

In order to ensure safe airtight sliding connection between the respective parts of the side walls 8 and 9 of the chamber 2, the sides of the flange 13 may be covered with some lubricating means, for instance glycerine, having the property that it does not evaporate and become hard, whereby it will ensure that the wall will function properly for a very long time.

Besides other advantages, this invention also makes it possible to construct the pressure chamber with such dimensions that the entire radial dimension of the pressure chamber with the tire proper will not be greater than the usual dimension of rubber pneumatic tires used at the present time. It is thus possible to attach the tire according to this invention on any standard automobile wheel without having to change the construction of the same.

It has been found that the depth in radial direction can be limited not to exceed one half of the dimension in axial direction of the pressure chamber, and it has been found that in some instances the first mentioned dimension does not need to be more than one fifth of the secondly mentioned dimension.

Claims:—

1. In a pneumatic tire, a closed annular air container, having non-elastic walls, the side-walls of which being parallel, an annular piston within said container formed of a resilient band, a wheel tread of resilient material, having a centrally disposed flange entering said annular air container and means to hold the entrance opening airtightly closed, said flange being formed and adapted to press evenly on the said annular piston.

2. In a pneumatic tire, a closed annular air container said container having non-elastic walls, and a flexible tread adapted to surround said container annularly and contacting the ground, an annular piston displaceable radially within said container, said piston being formed of a resilient band, and means for transferring the pressure exerted on the tread of the tire to said piston, to partially displace the piston radially in the said container, thereby creating an air-compression on the inside face of said piston and a vacuum on the outside of said piston.

3. A pneumatic tire according to claim 1, in which said means comprises flexible packings arranged between the sides of the said flange and out-bent extensions of the said non-elastic walls.

In testimony whereof I have signed my name unto this specification.

FELIX FRIDTJOV ANDERSEN.